US010727766B2

United States Patent
Fujii (10) Patent No.: US 10,727,766 B2
(45) Date of Patent: Jul. 28, 2020

(54) ROTATION SPEED CALCULATION DEVICE (71) Applicant: MABUCHI MOTOR CO., LTD., Chiba (JP)

(72) Inventor: Shumpei Fujii, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 3 days.

(21) Appl. No.: 16/149,134

(22) Filed: Oct. 2, 2018

(65) Prior Publication Data
US 2019/0103826 A1   Apr. 4, 2019

(30) Foreign Application Priority Data
Oct. 3, 2017 (JP) .................. 2017-193599

(51) Int. Cl.
*H02P 6/16* (2016.01)
*H02P 6/17* (2016.01)
*H02P 23/14* (2006.01)

(52) U.S. Cl.
CPC .............. *H02P 6/17* (2016.02); *H02P 23/14* (2013.01)

(58) Field of Classification Search
CPC .. H02P 21/18; H02P 23/14; H02P 6/28; H02P 6/08
See application file for complete search history.

(56) References Cited

U.S. PATENT DOCUMENTS

2016/0072424 A1*  3/2016  Yokozutsumi .... H02M 7/53875
318/503

FOREIGN PATENT DOCUMENTS

JP          2006-262590 A       9/2006

* cited by examiner

*Primary Examiner* — Karen Masih
(74) *Attorney, Agent, or Firm* — Hauptman Ham, LLP (57) ABSTRACT A rotation speed calculation device of a brushless motor includes: a current acquisition unit that acquires magnitude of current flowing through a coil of the brushless motor; a supply voltage acquisition unit that acquires supply voltage supplied to the brushless motor; and a calculation unit that calculates rotation speed of the brushless motor based on the magnitude of the current acquired by the current acquisition unit, the supply voltage acquired by the supply voltage acquisition unit, and a voltage equation calculating the rotation speed based on the magnitude of the current and the supply voltage. The voltage equation is an equation in which a member expressing a voltage drop due to inductance of a winding of the coil of the brushless motor is expressed by a product of a factor proportional to the current and a factor proportional to the rotation speed of the brushless motor.

4 Claims, 8 Drawing Sheets

| ITEM | VALUE | UNIT |
|---|---|---|
| PHASE-TO-PHASE RESISTANCE | 80 | mΩ |
| CIRCUIT RESISTANCE | 40 | mΩ |
| CURRENT PROPORTIONAL COEFFICIENT A × MOTOR SPEED PROPORTIONAL COEFFICIENT B | 15 | V/(A·krpm) |
| VOLTAGE CORRECTION VALUE | 512 | |
| PHASE-TO-PHASE REVERSE INDUCED VOLTAGE | 6.3 | Vrms/krpm |
| ADVANCE ANGLE CORRECTION VALUE | 1.01 | |
| MOTOR CONSTANT K | $\left(\begin{smallmatrix}\text{PHASE-TO-PHASE REVERSE}\\ \text{INDUCED VOLTAGE}\end{smallmatrix}\right) \times 1.35 \times$ 512.0/0.016509/1000.0 $\times \left(\begin{smallmatrix}\text{ADVANCE ANGLE}\\ \text{CORRECTION VALUE}\end{smallmatrix}\right)$ | |

ROTATION SPEED CALCULATION DEVICE

RELATED APPLICATIONS

The present application claims priority to Japanese Application No. 2017-193599 filed Oct. 3, 2017, the disclosure of which is hereby incorporated by reference herein in its entirety.

BACKGROUND

1. Technical Field

The present disclosure relates to a rotation speed calculation device.

2. Description of the Related Art

A hall sensor is attached to a brushless motor for detecting a rotation phase of the brushless motor for the drive of the brushless motor. When attaching a hall sensor to a brushless motor, each of three hall sensors that output one pulse for one turn of an electric angle is generally are attached to a position where the phase is shifted by 120 degrees.

To control the speed of a brushless motor using hall sensors, the pulse width of the hall sensor is measured and converted into speed, and the converted value is fed back to a control circuit as the speed of the brushless motor.

In the case of a hall sensor, pulse width information of just one pulse can be acquired from each of the three hall sensors for one turn of an electric angle. Therefore, when the brushless motor drives at low speed, the speed resolution is insufficient and it is difficult to drive the brushless motor at stable speed. To compensate for insufficient speed resolution, a sensor that outputs high-resolution pulses such as an optical encoder may be attached separately from the hall sensor. However, attaching an optical encoder increases costs.

When a brushless motor to be driven is known, technology for calculating the rotation speed of the brushless motor by with a voltage equation is known (for example, JP-A-2006-262590). To calculate the rotation speed of the brushless motor with this voltage equation, the value of the current flowing through the coil of the brushless motor and the differential value of the current are necessary.

SUMMARY

However, according to the related art as described in JP-A-2006-262590, it is necessary to add a filter to suppress an erroneous value from being read as the value of the motor current by the noise or the current disturbance when the value of the motor current is being read. However, when a filter is added, the error of the voltage drop value calculated from the inductance and the differential value of the current increases, and the predicted speed calculated from the voltage equation does not match the actual measurement value. A microcomputer may also be used for calculating the rotation speed of a brushless motor using a voltage equation. In this case, a large calculation capability is necessary for the calculation of the differential value of the current that appears in the voltage equation; therefore, use of a high-performance microcomputer becomes necessary, increasing the costs.

That is, according to the related art as described in JP-A-2006-262590, there has been an issue that it is difficult to drive a brushless motor at stable speed with a simple configuration.

An embodiment of the present disclosure is a rotation speed calculation device of a brushless motor, including: a current acquisition unit that acquires magnitude of current flowing through a coil of the brushless motor; a supply voltage acquisition unit that acquires supply voltage supplied to the brushless motor; and a calculation unit that calculates rotation speed of the brushless motor based on the magnitude of the current acquired by the current acquisition unit, the supply voltage acquired by the supply voltage acquisition unit, and a voltage equation calculating the rotation speed based on the magnitude of the current and the supply voltage. The voltage equation is an equation in which a member expressing a voltage drop due to inductance of a winding of the coil of the brushless motor is expressed by a product of a factor proportional to the current and a factor proportional to the rotation speed of the brushless motor.

According to an embodiment of the present disclosure, in the above rotation speed calculation device, the calculation unit may calculate the rotation speed based on an average value of the current flowing through the coil of the brushless motor, the supply voltage acquired by the supply voltage acquisition unit, and the voltage equation.

According to an embodiment of the present disclosure, in the above rotation speed calculation device, when the factor that is proportional to the current is defined as A, the factor that is proportional to the rotation speed of the brushless motor is defined as B, the rotation speed of the brush motor is defined as w, the magnitude of the current is defined as i, phase-to-phase resistance is defined as R, and the supply voltage is defined as v, the voltage equation may be an equation expressed by

[Mathematical 1]

$$Ri + Ai \cdot Bw + Kw = v \tag{1}$$

According to an embodiment of the present disclosure, in the above rotation speed calculation device, the calculation unit may calculate the rotation speed when no update of an output signal of a hall sensor that detects a rotation phase of the brushless motor occurs within a predetermined time.

The present disclosure can provide a rotation speed calculation device that can drive a brushless motor at stable speed with a simple configuration.

DESCRIPTION OF THE EMBODIMENTS

Embodiment

An embodiment of the present disclosure will be described below with reference to the drawings.

Figure 1:
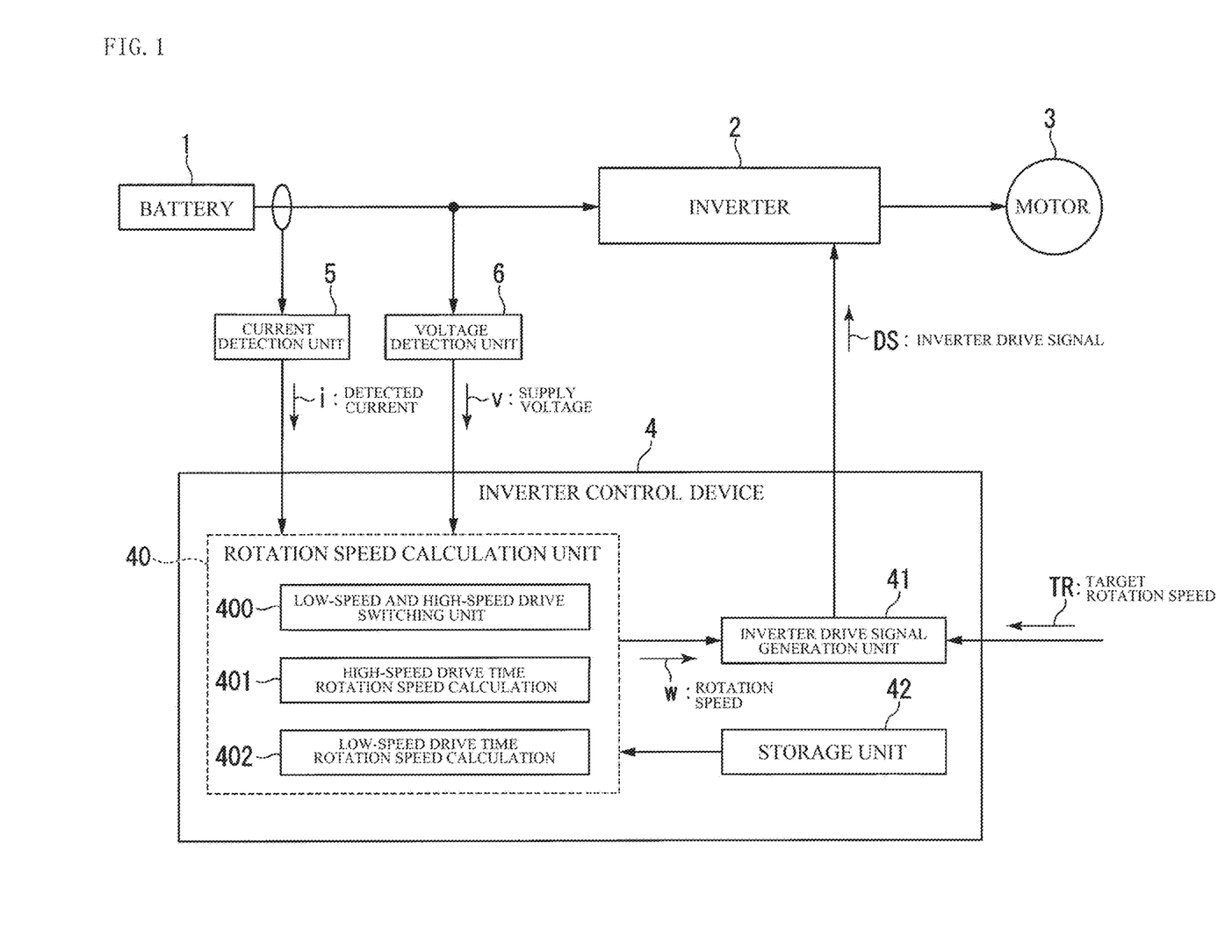
FIG. 1 is a diagram showing an example of a configuration of a motor control device according to the present embodiment.

FIG. 1 is a diagram showing an example of a configuration of a motor control device M of the present embodiment. The motor control device M is provided, for example, in an electric motor that needs low-speed drive such as an electric wheelchair and an electric mobility scooter. The motor control device M includes a battery 1, an inverter 2, a motor 3, an inverter control device 4, a current detection unit 5, and a voltage detection unit 6.

The battery 1 supplies DC power to the motor control device M. The battery 1 is, for example, a secondary battery such as a nickel-cadmium battery or a lithium ion battery, and supplies power to the motor control device M. The battery 1 is not limited to a secondary battery and may be a primary battery such as a dry battery.

The inverter 2 supplies the power supplied from the battery 1 to the motor 3. The inverter 2 converts the DC voltage supplied from the battery 1 into a three-phase AC voltage, and supplies the converted three-phase AC voltage to the motor 3.

The motor 3 is a three-phase brushless motor. The motor 3 includes a rotor (not shown) and a drive coil (not shown). The motor 3 rotates the rotor by the suction force or repulsive force caused by the magnetic force generated by the current supplied to the drive coil and the magnetic force of the permanent magnet included in the rotor.

The current detection unit 5 includes, for example, a clamp meter. The current detection unit 5 detects the magnitude (for example, a current value) of the DC current supplied to the inverter 2 from the battery 1. The current detection unit 5 supplies the detected magnitude of the DC current to the inverter control device 4 as current i.

The voltage detection unit 6 includes, for example, a voltage sensor. The voltage detection unit 6 detects the magnitude of the DC voltage supplied to the inverter 2. The voltage detection unit 6 supplies the detected magnitude of the DC voltage to the inverter control device 4 as supply voltage v.

The inverter control device 4 preforms feedback control of the inverter 2 in a manner that the motor 3 rotates at a target rotation speed TR. The inverter control device 4 includes a rotation speed calculation unit 40, an inverter drive signal generation unit 41, and a storage unit 42.

The rotation speed calculation unit 40 calculates rotation speed w of the motor 3. The rotation speed calculation unit 40 supplies the calculated rotation speed w to the inverter drive signal generation unit 41. The rotation speed calculation unit 40 is, for example, a microcomputer, and includes a low-speed and high-speed drive switching unit 400, a high-speed drive time rotation speed calculation unit 401, and a low-speed drive time rotation speed calculation unit 402 as the function units.

The low-speed and high-speed drive switching unit 400 calculates or switches the rotation speed w either by the high-speed drive time rotation speed calculation unit 401 or the low-speed drive time rotation speed calculation unit 402 in accordance with the rotation speed w calculated by the rotation speed calculation unit 40.

The high-speed drive time rotation speed calculation unit 401 calculates the rotation speed w when the motor control device M drives at high speed. Here, the case in which the motor control device M drives at high speed is, for example, the case in which the update of the output signals of the hall sensors that detect the rotation phase of the motor 3 occurs within a predetermined time, or the case in which the rotation speed w is larger than a predetermined value. The high-speed drive time rotation speed calculation unit 401 acquires the pulse time interval from each of the three hall sensors (not shown) attached to the motor 3. The high-speed drive time rotation speed calculation unit 401 calculates the rotation speed w of the motor 3 from the acquired pulse time interval.

The low-speed drive time rotation speed calculation unit 402 calculates the rotation speed w when the motor control device M drives at low speed. Here, the case in which the motor control device M drives at low speed is, for example, the case in which no update of the output signals of the hall sensors that detect the rotation phase of the motor 3 occurs within a predetermined time, or the case in which the rotation speed w is smaller than a predetermined value. The low-speed drive time rotation speed calculation unit 402 calculates the rotation speed w using the voltage equation to be described later. The low-speed drive time rotation speed calculation unit 402 acquires the detected current i from the current detection unit 5. The low-speed drive time rotation speed calculation unit 402 acquires the supply voltage v from the voltage detection unit 6. The low-speed drive time rotation speed calculation unit 402 acquires parameters of the voltage equation from the storage unit 42. The low-speed drive time rotation speed calculation unit 402 calculates the rotation speed w as a solution of the voltage equation using the acquired detected current i, the acquired supply voltage v, and the acquired parameters.

The inverter drive signal generation unit 41 generates an inverter drive signal DS. The inverter drive signal generation unit 41 supplies the generated inverter drive signal DS to the inverter 2. The inverter drive signal generation unit 41 acquires the target rotation speed TR from an operation part (not shown). The target rotation speed TR is a value indicating the rotation number of the motor 3 in a unit time controlled by the motor control device M. The inverter drive signal generation unit 41 acquires the rotation speed w from the rotation speed calculation unit 40. The inverter drive signal generation unit 41 compares the acquired target rotation speed TR and the acquired rotation speed w. The inverter drive signal generation unit 41 generates the inverter drive signal DS based on the comparison result.

The storage unit 42 stores the parameters of the voltage equation that are used by the low-speed drive time rotation speed calculation unit 402 for calculating the rotation speed w.

Here, the details of the low-speed drive time rotation speed calculation unit 402 will be described with reference to FIG. 2.

Configuration of Low-Speed Drive Time Rotation Speed Calculation Unit 402

Figure 2:
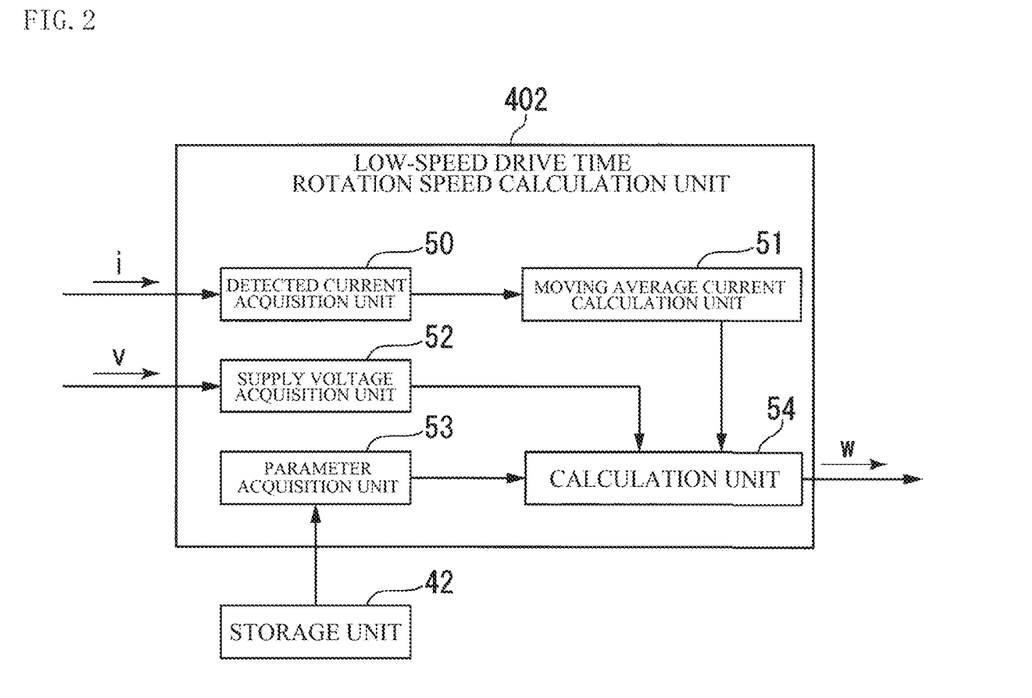
FIG. 2 is a diagram showing an example of a low-speed drive time rotation speed calculation unit 402 according to the present embodiment.

FIG. 2 is a diagram showing an example of a low-speed drive time rotation speed calculation unit 402 according to the present embodiment. The low-speed drive time rotation speed calculation unit 402 includes a detected current acquisition unit 50, a moving average current calculation unit 51, a supply voltage acquisition unit 52, a parameter acquisition unit 53, and a calculation unit 54.

The detected current acquisition unit 50 acquires the detected current i from the current detection unit 5. That is, the detected current acquisition unit 50 acquires the magnitude of the current flowing through the coil of the motor 3. The detected current acquisition unit 50 supplies the acquired detected current i to the moving average current calculation unit 51.

The moving average current calculation unit 51 acquires the detected current i from the detected current acquisition unit 50. The moving average current calculation unit 51 acquires the detected current i, for example, every 50 microseconds. The moving average current calculation unit 51 calculates the moving average of the acquired detected current i. The moving average current calculation unit 51 calculates the moving current for the detected current i for the detection of 64 times corresponding to 3.2 milliseconds, for example, every 50 microseconds of the detected current i. The moving average current calculation unit 51 supplies the calculated moving average to the calculation unit 54 as the moving average current.

The supply voltage acquisition unit 52 acquires the supply voltage v from the voltage detection unit 6. That is, the supply voltage acquisition unit 52 acquires the supply voltage supplied to the motor 3. The supply voltage acquisition unit 52 supplies the acquired supply voltage v to the calculation unit 54.

The parameter acquisition unit 53 acquires the parameters stored in the storage unit 42 from the storage unit 42. The parameter acquisition unit 53 supplies the acquired parameters to the calculation unit 54. Here, the parameters stored in the storage unit include phase-to-phase resistance R, a motor constant K, a current proportional coefficient A, and a motor speed proportional coefficient B.

The voltage equation of the motor 3 is shown in Equation (2).

[Mathematical 2]

$$Ri_{ave} + Ai_{ave} \cdot Bw + Kw = v \quad (2)$$

where iave is the moving average current acquired from the moving average current calculation unit 51. The symbol w is the rotation speed w calculated by the calculation unit 54. The symbol v is the supply voltage v acquired from the supply voltage acquisition unit 52. The symbol R is the phase-to-phase resistance R acquired from the storage unit 42. The current proportional coefficient A is a coefficient of a component that is proportional to the phase current flowing through the drive coil among the voltage drop caused by the inductance of the drive coil of the motor 3. The motor speed proportional coefficient B is a coefficient of a component that is proportional to the rotation speed of the motor 3 among the voltage drop caused by the inductance of the drive coil of the motor 3. The symbol K is a motor constant K. The motor constant K is an induced voltage constant. Equation (2) is a voltage equation in which the member expressing the voltage drop due to the inductance of the winding of the coil of the motor 3 is expressed by the product of the factor proportional to the current and the factor proportional to the rotation speed w of the motor 3.

Equation (3) is derived from Equation (2). The calculation unit 54 calculates the rotation speed w using Equation (3). That is, the calculation unit 54 calculates the rotation speed w based on the magnitude of the detected current i, the supply voltage v, and the voltage equation. The detected current i is acquired by the detected current acquisition unit 50, and the supply voltage is acquired by the supply voltage acquisition unit 52. The voltage equation is an equation for calculating the rotation speed w of the motor 3 based on the magnitude of the detected current i and the supply voltage v. Furthermore, the calculation unit 54 calculates the rotation speed w based on the moving average current iave of the current flowing through the coil of the motor 3, the supply voltage v acquired by the supply voltage acquisition unit 52, and the voltage equation.

[Mathematical 3]

$$w = \frac{v - R \cdot i_{ave}}{K + A \cdot B \cdot i_{ave}} \quad (3)$$

Rotation Speed Calculation Processing

Figure 3:
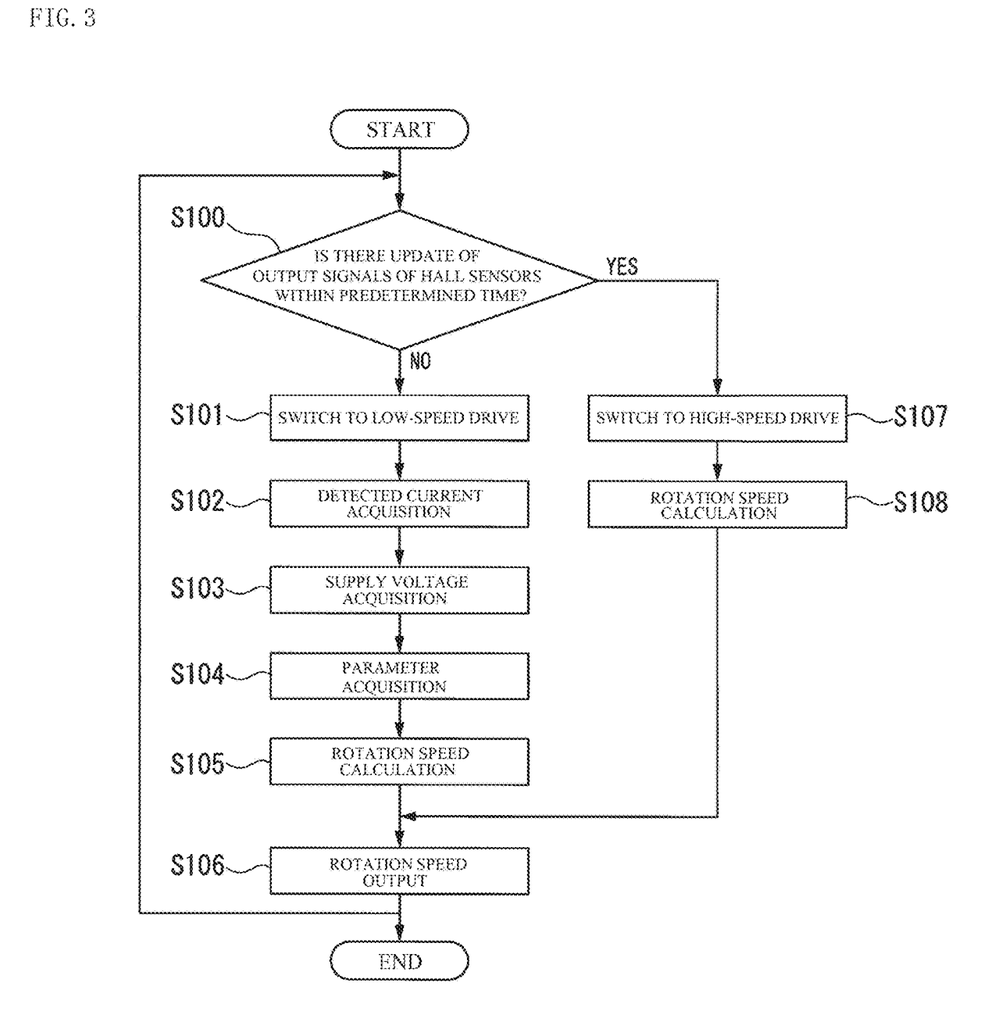
FIG. 3 is a diagram showing an example of rotation speed calculation processing according to the present embodiment.

FIG. 3 is a diagram showing an example of rotation speed calculation processing according to the present embodiment. The processing shown in the flowchart of FIG. 3 is started when the power of the motor control device M is turned on. When the power of the motor control device M is turned on, the inverter control device 4 starts time counting with a time counting unit (not shown).

The low-speed and high-speed drive switching unit 400 determines whether or not there is update of the output signals of the three hall sensors (not shown) attached to the motor 3 within a predetermined time (Step S100). Here, the low-speed and high-speed drive switching unit 400 acquires the pulse time interval from the high-speed drive time rotation speed calculation unit 401, and determines whether or not there is update of the output signals of the hall sensors within a predetermined time from the acquired pulse time interval. The predetermined time is, for example, one second. When the low-speed and high-speed drive switching unit 400 determines that there is no update of the hall sensors during a predetermined time (Step S100; NO), the low-speed and high-speed drive switching unit 400 switches to low-speed drive (Step S101). However, when the inverter control device 4 performs the low-speed drive, the low-speed and high-speed drive switching unit 400 allows the inverter control device 4 to continue the low-speed drive. On the other hand, when the low-speed and high-speed drive switching unit 400 determines that there is update of the hall sensors during a predetermined time (Step S100; YES), the low-speed and high-speed drive switching unit 400 switches to high-speed drive (Step S107). However, when the inverter control device 4 performs the high-speed drive, the low-speed and high-speed drive switching unit 400 allows the inverter control device 4 to continue the high-speed drive.

When the low-speed and high-speed drive switching unit 400 switches to low-speed drive, the low-speed and high-speed drive switching unit 400 operates the low-speed drive time rotation speed calculation unit 402. The low-speed drive time rotation speed calculation unit 402 acquires the detected current i from the current detection unit 5 (Step S102). The low-speed drive time rotation speed calculation unit 402 acquires the supply voltage v from the voltage detection unit 6 (Step S103). The low-speed drive time rotation speed calculation unit 402 acquires the parameters from the storage unit 42 (Step S104). The low-speed drive time rotation speed calculation unit 402 calculates the rotation speed w using the acquired detected current i, the acquired supply voltage v, the acquired parameters, and the voltage equation shown in Equation (2) (Step S105). In the low-speed drive time rotation speed calculation unit 402, the calculation unit 54 calculates the rotation speed w. That is, the calculation unit 54 calculates the rotation speed w when no update of the output signals of the hall sensors that detect the rotation phase of the motor 3 occurs within a predetermined time.

On the other hand, when the low-speed and high-speed drive switching unit 400 switches to high-speed drive, the low-speed and high-speed drive switching unit 400 operates the high-speed drive time rotation speed calculation unit 401. The high-speed drive time rotation speed calculation unit 401 calculates the rotation speed w (Step S108).

The rotation speed calculation unit 40 outputs the calculated rotation speed w to the inverter drive signal generation unit 41 (Step S106). Thereafter, the low-speed and high-speed drive switching unit 400 repeats the processing of Step S100.

In the example of the processing shown in FIG. 3, the low-speed and high-speed drive switching unit 400 switches the low-speed drive and the high-speed drive based on whether or not there is update of the hall sensors; however, the low-speed and high-speed drive switching unit 400 may also switch the low-speed drive and the high-speed drive based on the rotation speed w. The case in which the low-speed and high-speed drive switching unit 400 switches the low-speed drive and the high-speed drive based on the rotation speed w will be explained with reference to FIG. 4.

Figure 4:
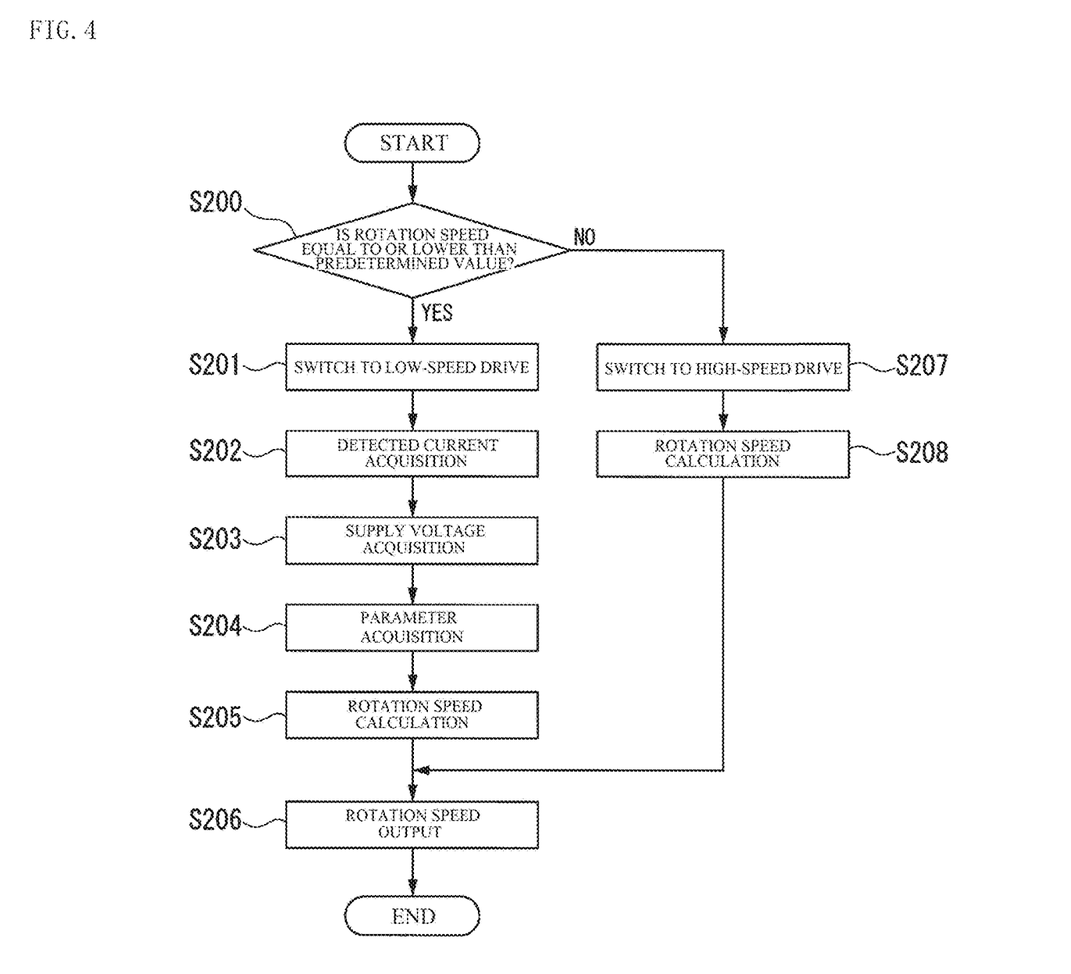
FIG. 4 is a diagram showing a modification of the rotation speed calculation processing according to the present embodiment.

FIG. 4 is a diagram showing a modification of the rotation speed calculation processing according to the present embodiment. The processing in Step S201, Step S202, Step S203, Step S204, Step S205, Step S206, Step S207, and Step S208 is similar to the processing in Step S101, Step S102, Step S103, Step S104, Step S105, Step S106, and Step S107, and Step S108 in FIG. 3; therefore, the description thereof will be omitted.

The processing shown in the flowchart of FIG. 4 is started when the power of the motor control device M is turned on. The low-speed and high-speed drive switching unit 400 acquires the rotation speed w from the high-speed drive time rotation speed calculation unit 401 or the low-speed drive time rotation speed calculation unit 402. The low-speed and high-speed drive switching unit 400 determines whether or not the acquired rotation speed w is equal to or lower than a predetermined value (Step S200). When the low-speed and high-speed drive switching unit 400 determines that the rotation speed w is equal to or lower than a predetermined value (Step S200; YES), the low-speed and high-speed drive switching unit 400 switches to low-speed drive (Step S201). On the other hand, when the low-speed and high-speed drive switching unit 400 determines that the rotation speed w is not equal to or lower than a predetermined value (Step S200; NO), the low-speed and high-speed drive switching unit 400 switches to high-speed drive (Step S207). However, right after the power of the motor control device M is turned on, the low-speed and high-speed drive switching unit 400 may switch to low-speed drive or high-speed drive based on a predetermined setting.

Comparison with Related Art

A voltage equation of the related art for calculating the rotation speed of a motor will be described to compare it with how the calculation unit 54 according to the present embodiment calculates the rotation speed w of the motor 3. In the related art, the rotation speed of a motor has been calculated with the voltage equation shown in Equation (4).

[Mathematical 4]

$$Ri + L\frac{di}{dt} + Kw = v \qquad (4)$$

where i is an instantaneous value of the phase current flowing through the coil of the motor. In Equation (4), the voltage drop caused by the inductance of the drive coil of the motor includes a differential value of the phase current. The processing load of the microcomputer becomes large when Equation (4) is used to calculate the rotation speed of the motor because of the calculation of the differential value. The error of the rotation speed to be calculated also becomes large when the noise of the phase current is large because Equation (4) uses the instantaneous value of the phase current. In addition, Equation (4) uses the value of the phase current; therefore, the control device has to acquire three values of the phase current and perform processing, and the processing becomes heavy. Further, three current sensors for detecting the phase current must be attached to the motor.

On the other hand, in the present embodiment, the rotation speed w of the motor 3 is calculated by the voltage equation shown in Equation (2). Since a differential value is not included in Equation (2), the processing of the inverter control device 4 becomes lighter at the time of calculation of the rotation speed w of the motor 3 compared with the case in which Equation (4) is used. The inverter control device 4 can be realized by a low-grade microcomputer. In Equation (2), a moving average of current is used instead of an instantaneous value of current; therefore, the influence of the noise on the calculation result of the rotation speed w can be reduced even when the noise of the phase current is large. When the moving average of current is used, the influence of the noise can be reduced, by about 15 percent for example, compared with the case in which the instantaneous value of current is used. In addition, Equation (2) uses the detected current i, which is a value of DC current, instead of phase current, for calculation of the moving average. Since one value of DC current is used, the processing becomes lighter compared with the case in which the three values of phase current are used. Further, instead of attaching three current sensors to the motor, one current detection unit 5 may be provided that detects the DC current supplied by the battery 1.

In Equation (2) of the present embodiment, the case in which a moving average of current instead of an instantaneous value of current is used has been explained; however, the low-speed drive time rotation speed calculation unit 402 may calculate the rotation speed w using an instantaneous value of current instead of a moving average of current in Equation (2) when the noise of the current is not large.

Calculation of Voltage Equation

The mechanism how the low-speed drive time rotation speed calculation unit 402 calculates the rotation speed w based on the voltage equation shown in Equation (3) has been explained. As described above, Equation (3) is based on Equation (2). A method for calculating Equation (2) will be described with reference to FIG. 5.

Figure 5:
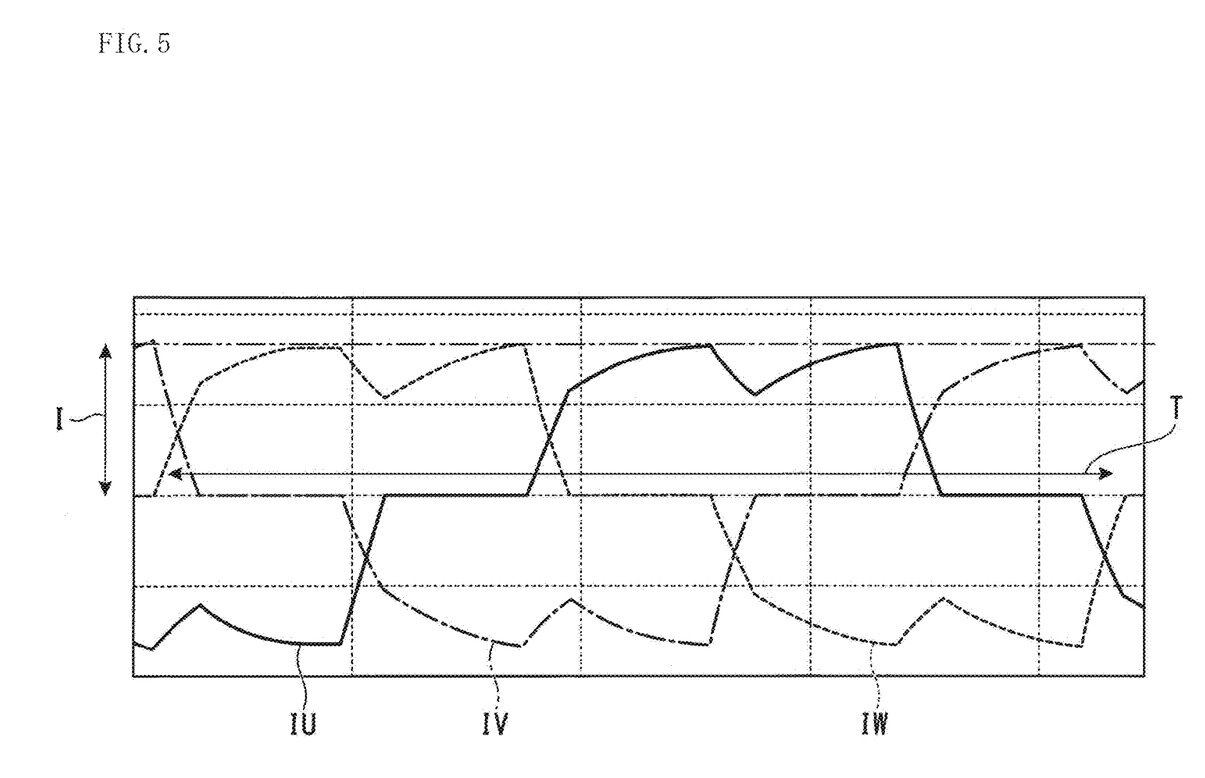
FIG. 5 is a diagram showing an example of phase current values used for calculation of a voltage equation according to the present embodiment.

FIG. 5 is a diagram showing an example of phase current values used for calculation of a voltage equation according to the present embodiment. In the graph shown in FIG. 5, three phase current that flows through the coil of the motor 3, which are phase current IU, phase current IV, and phase current IW, are drawn with respect to time. The voltage drop caused by the inductance of the drive coil of the motor 3 is considered to be determined by the magnitude of the amplitude of the phase current and a current frequency T.

First, a method for deriving the current proportional coefficient A will be described. The rotation speed w can be expressed using the current frequency T and a pole pair number P as shown in Equation (5).

[Mathematical 5]

$$w = \frac{2\pi P}{T} \quad (5)$$

When the current frequency T is constant, the voltage drop depending on the moving average current $i_{ave}$ is dominant in the periodical component. The voltage drop depending on the moving average current $i_{ave}$ can be expressed by Equation (6).

[Mathematical 6]

$$\frac{2\pi P}{T} L i_{ave} \quad (6)$$

where L is inductance L of the motor 3. Based on Equation (6), the current proportional coefficient A is expressed by Equation (7).

[Mathematical 7]

$$A = \frac{2\pi P}{T} L \quad (7)$$

Next, a method for deriving the motor speed proportional coefficient B will be described. Through the coil of the motor 3, each of the phase current IU, the phase current IV, and the phase current IW flows in the phase for each time. When the value of the phase current having the largest value for each time among the phase current IU, the phase current IV, and the phase current IW is a current constant value I, a voltage drop depending on the rotation speed w can be expressed by Equation (8).

[Mathematical 8]

$$LIw \quad (8)$$

Therefore, based on Equation (8), the motor speed proportional coefficient B is expressed by Equation (9).

[Mathematical 9]

$$B = LI \quad (9)$$

The voltage drop caused by the inductance of the drive coil of the motor 3 becomes Equation (10) when the product of the voltage drop depending on the moving average current $i_{ave}$ and the voltage drop depending on the rotation speed w is obtained and the value that overlaps with the inductance L of the motor 3 is divided by the inductance L.

[Mathematical 10]

$$A i_{ave} \cdot B w \quad (10)$$

Simulation will be used to ensure that Equation (10) is correct.

Figure 6:
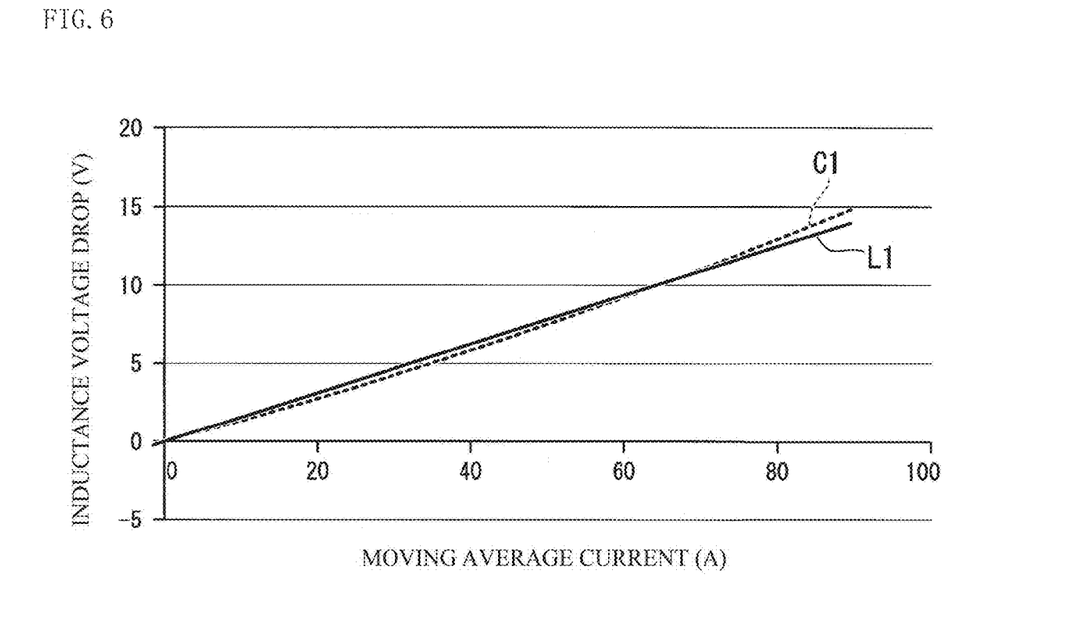
FIG. 6 shows an example of a relationship between moving average current and an inductance voltage drop according to the present embodiment.

FIG. 6 shows an example of a relationship between moving average current and an inductance voltage drop according to the present embodiment. In FIG. 6, the rotation speed w is set to a constant value of 1,500 rpm, a load having constant speed is used, and the duty ratio is changed for the load. The inductance voltage drop changes as a quadratic function of the moving average current. In FIG. 6, the quadratic function is shown by a curve C1. When the curve C1 is approximated by a straight line L1, the value of the proportional constant with respect to the moving average current of the inductance voltage drop has become 0.1561. This proportional constant corresponds to the current proportional coefficient A of Equation (7).

Figure 7:
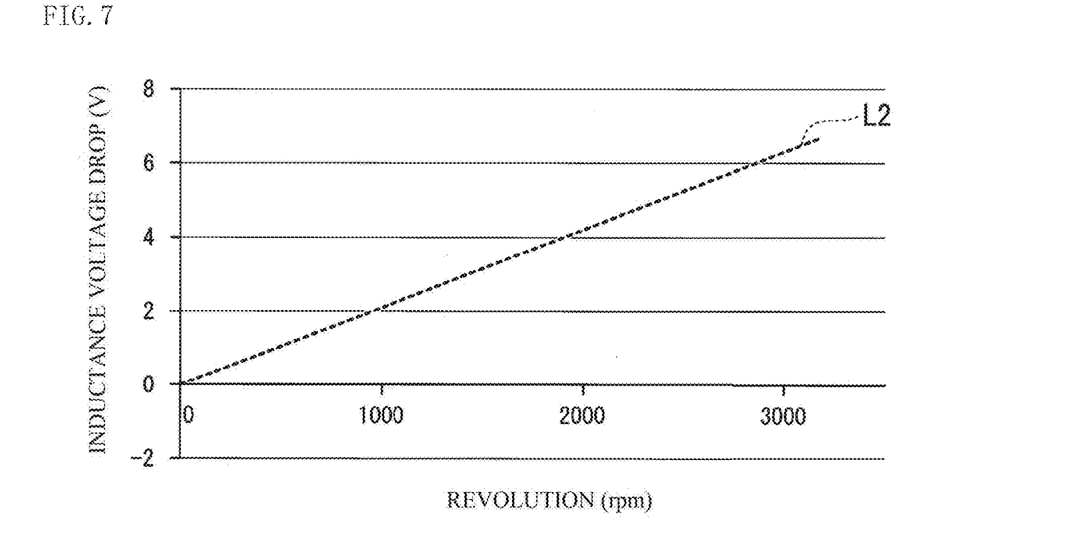
FIG. 7 is a diagram showing an example of a relationship between motor revolution and the inductance voltage drop according to the present embodiment.

FIG. 7 is a diagram showing an example of a relationship between motor revolution and the inductance voltage drop according to the present embodiment. In FIG. 7, the load of the motor 3 is set to a constant value of 2.3 Nm, the moving average current is set to a constant value of 23.7 amperes, and the duty ratio is changed for the change of the revolution. The inductance voltage drop is proportional to the revolution. In FIG. 7, this proportional relationship is shown by straight line L2. The value of the proportional constant has become 0.0021. This proportional constant corresponds to the motor speed proportional coefficient B of Equation (9).

Figure 8:
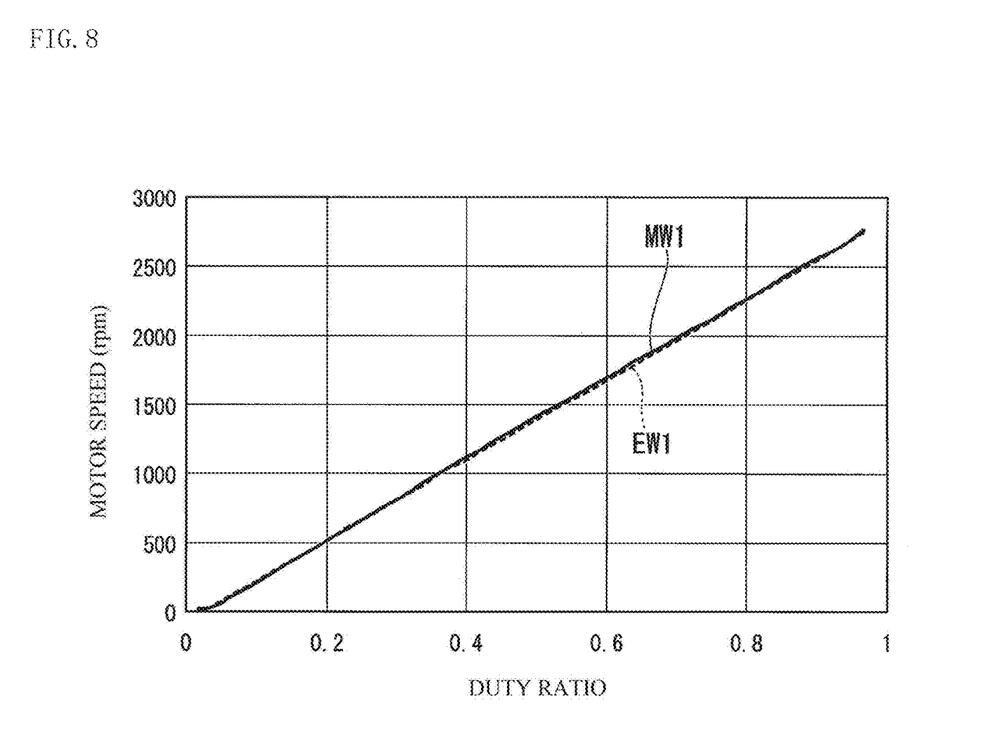
FIG. 8 is a diagram showing a first example of comparison between predicted rotation speed and an actual measurement value according to the present embodiment.

The rotation speed w calculated with Equation (3) and the actual measurement value of the rotation speed will be compared.

FIG. 8 is a diagram showing a first example of comparison between predicted rotation speed and an actual measurement value according to the present embodiment. FIG. 8 compares the rotation speed w in which the duty ratio has been changed and the actual measurement value of the rotation speed by the pulse width speed in open loop control. In FIG. 8, the rotation speed w calculated with Equation (3) is shown by a dotted line EW1, and the measurement value of the rotation speed by the pulse width speed is shown by a solid line MW1. The supply voltage v is 24 V.

The motor constant K is a value obtained by multiplying the line voltage by 1.35. However, the motor constant changes in the case of an advance angle; therefore, the value obtained by multiplying the line voltage by 1.35 and adding the advance angle to the multiplied value may be used as the motor constant K.

The phase-to-phase resistance R is influenced not only by the correlation resistance but also by the wiring resistance and the ON resistance of the PET; therefore, the value obtained by adding a correction value to the correlation resistance may be used as the phase-to-phase resistance R. In the example shown in FIG. 8, the value obtained by adding a correction value of 40 mΩ to correlation resistance of 80 mΩ is used as the phase-to-phase resistance R.

At the time of starting, the motor 3 does not start unless there is supply voltage having a duty ratio equal to or higher than a predetermined value. The value of the rotation speed w may be corrected with the value of the duty ratio as a cogging torque offset. In the example shown in FIG. 8, the rotation speed w is corrected with the voltage having a duty ratio of 3.6% or more as the cogging torque offset.

The rotation speed w calculated with Equation (3) coincides with the actual measurement value of the rotation speed by the pulse width speed in the range of ±50 rpm.

Figure 9:
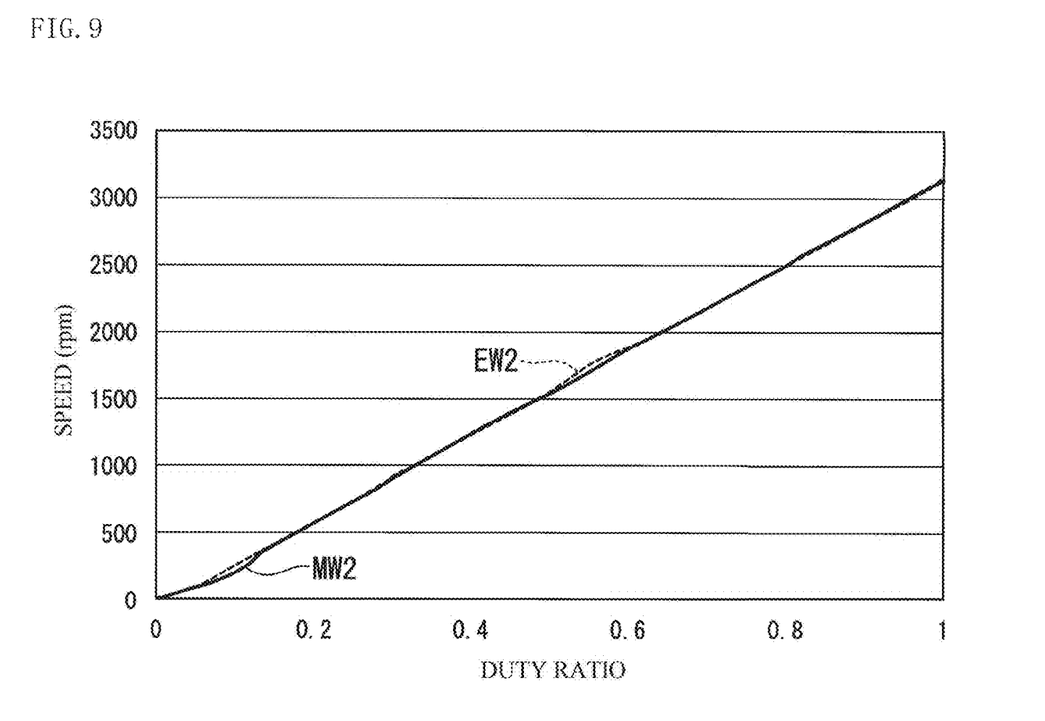
FIG. 9 is a diagram showing a second example of the comparison between the predicted rotation speed and the actual measurement value according to the present embodiment.

Next, the predicted rotation speed and the actual measurement value when synchronous rectification is performed are compared.

FIG. 9 is a diagram showing a second example of the comparison between the predicted rotation speed and the actual measurement value according to the present embodiment. In the example shown in FIG. 9, synchronous rectification is performed, and the rotation speed w when the duty ratio is changed and the actual measurement value of the rotation speed by the pulse width speed are compared in a state in which the motor is unloaded. In FIG. 9, the rotation speed w calculated with Equation (3) is shown by a dotted line EW2, and the actual measurement value of the rotation speed by the pulse width speed is shown by a solid line MW2. The rotation speed w calculated with Equation (3) coincide with the measurement value of the rotation speed by the pulse width speed.

Here, various parameters used for the comparison in FIG. 9 will be described with reference to FIG. 10.

Figure 10:
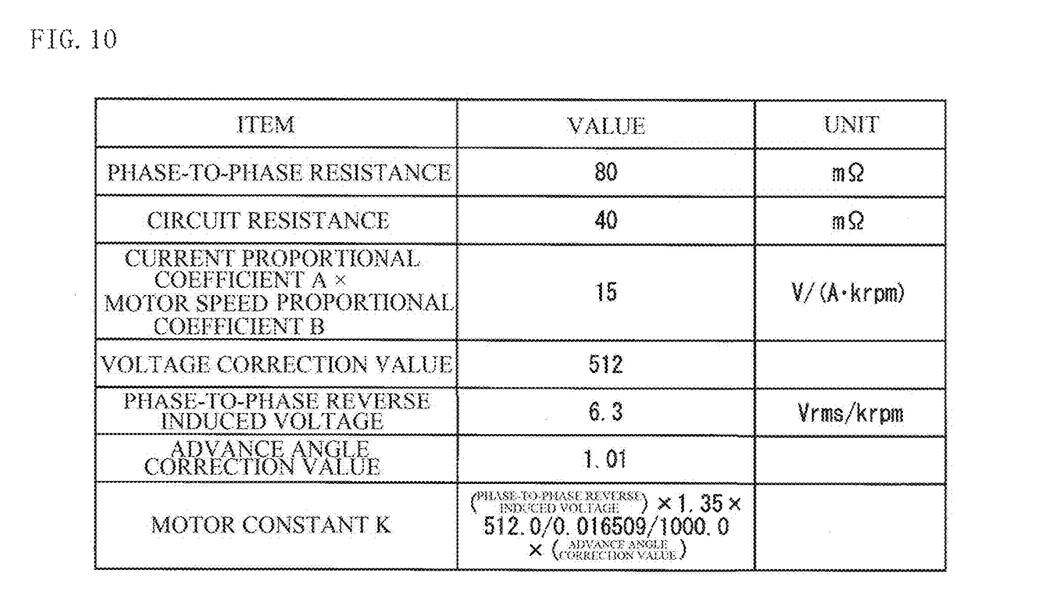
FIG. 10 is a diagram showing an example of parameter values used for prediction of rotation speed according to the present embodiment.

FIG. 10 is a diagram showing an example of parameter values used for prediction of rotation speed according to the present embodiment. The phase-to-phase resistance is set to 80 mΩ, the circuit resistance is set to 40 mΩ, and the value obtained by adding circuit resistance of 40 mΩ to correlation resistance of 80 mΩ as a correction value is used as the phase-to-phase resistance R. The product of the current proportional coefficient A and the motor speed proportional coefficient B is 15. The voltage correction value is 512. The motor constant K corrects the value obtained by multiplying phase-to-phase reverse induced voltage by 1.35 using the advance angle correction value. Here, the phase-to-phase reverse induced voltage is 6.3 Vrms/krpm, and the advance angle correction value is 1.01.

Conclusion

As described above, the low-speed drive time rotation speed calculation unit 402 according to the present embodiment includes the detected current acquisition unit 50, the supply voltage acquisition unit 52, and the calculation unit 54.

The detected current acquisition unit 50 acquires the magnitude of the current flowing through the coil of the motor 3.

The supply voltage acquisition unit 52 acquires the supply voltage v supplied to the motor 3.

The calculation unit 54 calculates the rotation speed w based on the magnitude of the current (detected current i), the supply voltage v, and the voltage equation. The magnitude of the current (detected current i) is acquired by the detected current acquisition unit 50. The supply voltage v is acquired by the supply voltage acquisition unit 52. The voltage equation is an equation for calculating the rotation speed w of the motor 3 based on the magnitude of the current (detected current i) and the supply voltage v. In addition, in this voltage equation, the member expressing the voltage drop due to the inductance of the winding of the coil of the motor 3 is expressed by the product of the factor proportional to the current and a factor proportional to the rotation speed w of the motor 3.

According to this configuration, the low-speed drive time rotation speed calculation unit 402 according to the present embodiment can calculate the rotation speed w without calculating the differential value of the current, thus realizing the driving of the brushless motor at stable speed with a simple configuration.

In addition, the calculation unit 54 calculates the rotation speed w based on the moving average current of the current flowing through the coil of the motor 3, the supply voltage acquired by the supply voltage acquisition unit 52, and the voltage equation.

With this configuration, the low-speed drive time rotation speed calculation unit 402 according to the present embodiment can reduce the influence of the current noise on the rotation speed w when calculating the rotation speed w with the voltage equation; therefore, the brushless motor can be driven at stable speed with a simple configuration even when the current noise is large.

In addition, the voltage equation is expressed by the equation below when the factor that is proportional to the current is defined as A, the factor is proportional to the rotation speed of the motor 3 is defined as B, the rotation speed of the motor 3 is defined as w, the magnitude of the current is defined as i, the phase-to-phase resistance is defined as R, and the supply voltage is defined as v.

[Mathematical 11]

$$Ri + Ai \cdot Bw + Kw = v \quad (11)$$

With this configuration, the low-speed drive time rotation speed calculation unit 402 according to the present embodiment can calculate the rotation speed w without calculating the differential value of the current, thus realizing the driving of the brushless motor at stable speed with a simple configuration.

In addition, the calculation unit 54 calculates the rotation speed w when no update of the output signals of the hall sensor that detects the rotation phase of the motor 3 occurs within a predetermined time.

With this configuration, the low-speed drive time rotation speed calculation unit 402 according to the present embodiment may calculate the rotation speed w without calculating the differential value of the current at low-speed drive, thus realizing the low-speed driving of the brushless motor at stable speed with a simple configuration.

In the above, the embodiment of the present disclosure has been described in detail with reference to the drawings; however, the specific configuration is not limited to this embodiment and may be modified as necessary without deviating from the purpose and scope of the present disclosure.

Each of the above devices has a computer inside. The process of the processing of each of the above devices is stored in a computer-readable recording medium in the form of programs. The programs are read and executed by computers, and thus, the above processing is performed. Here, a computer-readable recording medium includes a magnetic disk, a magneto-optical disk, a CD-ROM, a DVD-ROM, and a semiconductor memory. In addition, the computer program may be distributed to a computer through a communication line, and the computer receiving the distribution may execute the program.

The above program may also be used to realize a part of the functions described above. Furthermore, the functions described above may be realized in combination with the programs already recorded in the computer system, which is the so-called difference file (difference program).

REFERENCE SIGNS LIST

M motor control device
1 battery 2 inverter
3 motor
4 inverter control device
5 current detection unit
6 voltage detection unit
40 rotation speed calculation unit
41 inverter drive signal generation unit
42 storage unit
400 low-speed and high-speed drive switching unit
401 high-speed drive time rotation speed calculation unit
402 low-speed drive time rotation speed calculation unit
50 detected current acquisition unit
51 moving average current calculation unit
52 supply voltage acquisition unit
53 parameter acquisition unit
54 calculation unit
i detected current
v supply voltage
w rotation speed
TR target rotation speed
DS inverter drive signal
T current frequency
I current constant value
R phase-to-phase resistance
K motor constant
A current proportional coefficient
B motor speed proportional coefficient
P pole pair number

The invention claimed is:

1. A rotation speed calculation device of a brushless motor, comprising:
    a current acquisition unit that acquires magnitude of current flowing through a coil of the brushless motor;
    a supply voltage acquisition unit that acquires supply voltage supplied to the brushless motor; and
    a calculation unit that calculates rotation speed of the brushless motor based on the magnitude of the current acquired by the current acquisition unit, the supply voltage acquired by the supply voltage acquisition unit, and a voltage equation calculating the rotation speed based on the magnitude of the current and the supply voltage, wherein
    the voltage equation is an equation in which a member expressing a voltage drop due to inductance of a winding of the coil of the brushless motor is expressed by a product of a factor proportional to the current and a factor proportional to the rotation speed of the brushless motor.

2. The rotation speed calculation device according to claim 1, wherein
    the calculation unit calculates the rotation speed based on an average value of the current flowing through the coil of the brushless motor, the supply voltage acquired by the supply voltage acquisition unit, and the voltage equation.

3. The rotation speed calculation device according to claim 1, wherein
    when the factor that is proportional to the current is defined as A, the factor that is proportional to the rotation speed of the brushless motor is defined as B, the rotation speed of the brush motor is defined as w, the magnitude of the current is defined as i, phase-to-phase resistance is defined as R, and the supply voltage is defined as v, the voltage equation is an equation expressed by

[Mathematical 1]

$$Ri+Ai \cdot Bw+Kw=v.$$

4. The rotation speed calculation device according to claim 1, wherein
    the calculation unit calculates the rotation speed when a motor control device drives at a low speed.

* * * * *